Aug. 1, 1961  R. E. SCOVEL ET AL  2,994,592
COMPOSTING

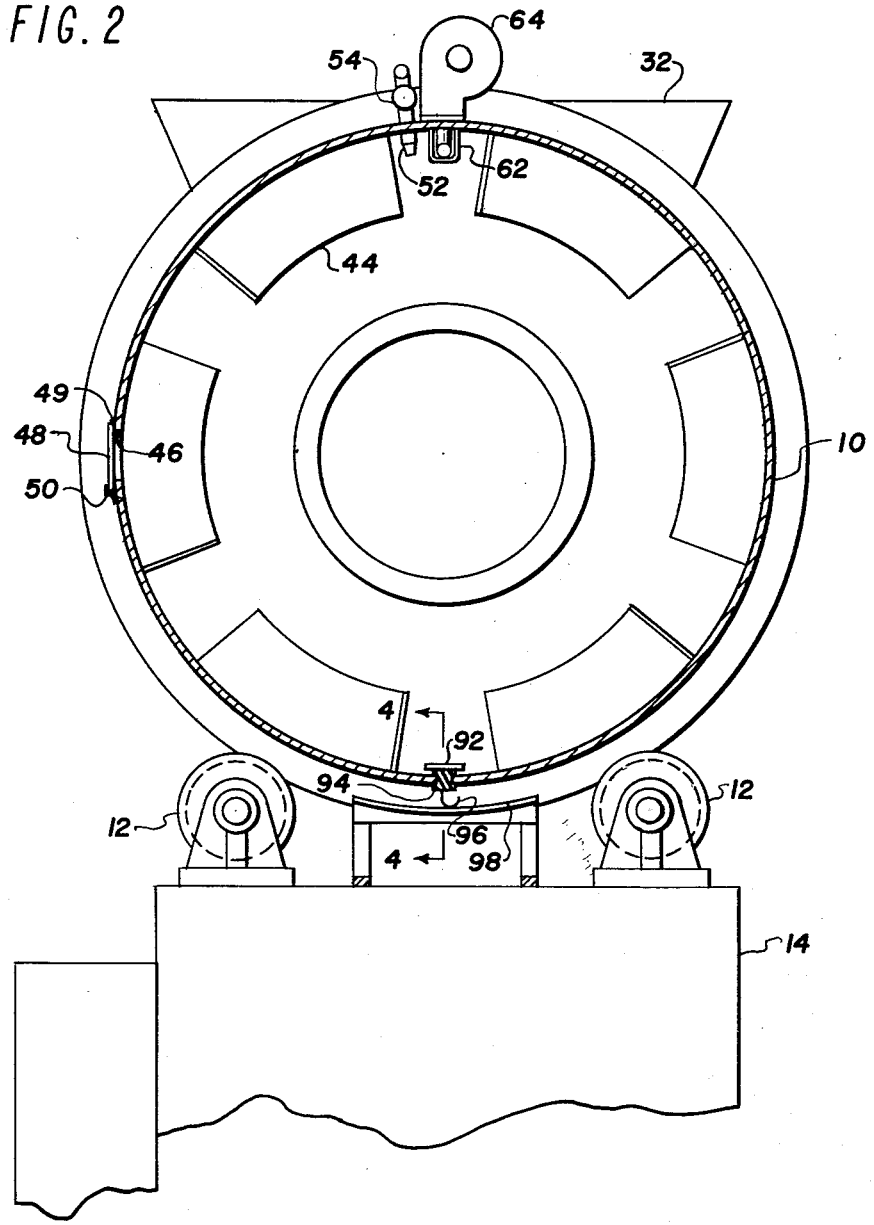

Filed May 26, 1958  3 Sheets-Sheet 3

INVENTOR.
RALPH E. SCOVEL
BENJAMIN G. PETTRUCCI
BY
Christie, Parker & Hale
ATTORNEYS

United States Patent Office 2,994,592
Patented Aug. 1, 1961

2,994,592
COMPOSTING
Ralph E. Scovel, Kentfield, and Benjamin G. Petrucci, Sacramento, Calif., assignors to Dano of America, Inc., Sacramento, Calif., a corporation of California
Filed May 26, 1958, Ser. No. 737,885
1 Claim. (Cl. 23—259.1)

This invention relates to composting, and particularly to the composting of municipal refuse of the types collected in most urban communities throughout the United States. It provides an improved process and apparatus in which the organic content (garbage) of municipal refuse is converted rapidly and safely into a sanitary and valuable soil additive (humus, or compost) without the exposure of the refuse to flies, rodents, or other disease carriers.

At the present time, municipal refuse is disposed of either in city dumps, by land fill operations, or by incineration.

The city dump is an eye sore, a smoke and odor nuisance, a health hazard, and an economic waste. Modern incinerator plants eliminate the eye sore, the nuisance and the health hazard, but they are expensive to build and operate, consume large quantities of fuel, and burn up minerals and organic matter which should be returned to the soil. Disposal of municipal waste by land fill operations is usually as satisfactory as incineration and generally cheaper, provided the refuse is properly leveled and covered, and provided further that the large areas of land required are not too distant from the refuse source; but the humus which eventually forms in such fills is not readily available for agriculture, and can probably be recovered, if at all, only after several generations and then only when the local need for humus justifies an extensive mining operation.

Composting involves the conversion of solid organic material to humus through the action of micro-organisms. It has been employed in Europe in a number of instances to convert municipal garbage into marketable humus, but under economic conditions very different from those in the United States. U.S. Patent 2,241,734 describes apparatus and a method for composting refuse which was developed in Europe. Briefly, the patent discloses the composting of refuse by a regulated aerobic biological conversion in a rotating container with the passage of air through the container as the refuse is tumbled in it. According to the patent, tumbled refuse is alternately submerged in a pool of water in the rotatable container and lifted out of the water to come in contact with the air flowing through the container. Sufficient water is added to the inlet end of the rotatable container with the municipal refuse to insure an operating level of water in the container during the composting operation. Thus, the refuse is introduced in a wet, sloppy state, and the final product needs to be dried by sedimentation, centrifuging, or some other suitable process to facilitate its handling, storage, and shipping.

This invention provides apparatus for composting tumbling refuse in a relatively dry state. The refuse is added to the apparatus in its natural condition of moisture content, and the product leaves relatively dry.

With the present invention, the refuse and final product are neater and easier to handle. Even more important, we have found that optimum composting conditions prevail, as far as typical United States municipal refuse is concerned, when the moisture content of the solids in the container is maintained between about 30% and 65% by weight.

In terms of apparatus, the invention contemplates apparatus for composting refuse comprising a rotatable hollow body or container. Means are provided for introducing refuse into the body and means are provided for rotating the body so the refuse in it is tumbled. Means are also provided for introducing water to the refuse in the body at a plurality of spaced locations, and means are included for removing the tumbled composted refuse from the body.

In the preferred form of the invention, the apparatus includes means for adding air at the spaced locations, and sample ports are in the wall of the container for taking samples from the tumbled refuse at spaced locations to determine its moisture content and other physical properties. Also in the preferred form, means are provided for automatically regulating the amount of water and air injected at spaced locations to maintain the desired moisture content.

In terms of method, the invention involves tumbling the refuse in a container and maintaining the moisture content of the refuse between about 30% and about 65% by weight to effect composting of the refuse. Preferably air and water are added to the refuse at spaced locations to maintain the desired moisture content.

These and other aspects of the invention will be more fully understood from the following detailed description taken in conjunction with the accompanying drawings in which:

FIG. 2 is a view taken on line 2—2 of FIG. 1;

Figure 1:
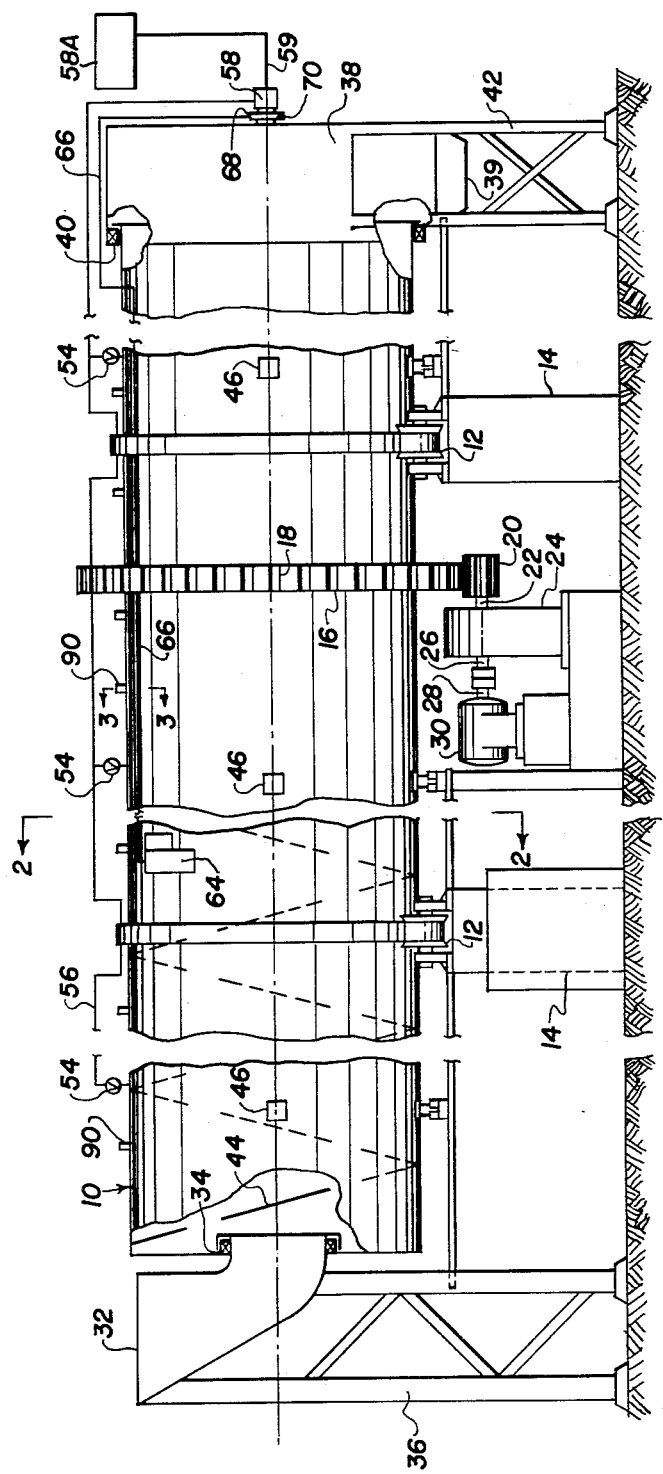
FIG. 1 is a fragmentary side elevation of the presently preferred form of the apparatus.

Referring to FIG. 1, the apparatus includes an elongated horizontal rotatable cylinder or container 10, which is also referred to as a bio-stabilizer or digestor tube. The tube is supported for rotation on two separate pairs of laterally spaced rollers 12 mounted on two foundations 14 spaced along the longitudinal axis of the tube. A ring gear 16 with external teeth 18 is mounted around the outside and central portion of the tube and is driven by a pinion gear 20 mounted on an output shaft 22 of a gear reduction box 24 which has an input shaft 26 coupled to a drive shaft 28 of an electric motor 30 powered by suitable means (not shown). An inlet hopper 32, open at the upper end, is connected through a rotatable bearing and seal 34 to the inlet (left hand end as viewed in FIG. 1) of the tube. The inlet hopper is mounted on the upper end of an upright support 36. An outlet hopper 38, having a discharge opening 39 in its lower portion, is connected by a rotatable bearing and seal 40 to the other end of the tube. The outlet hopper is mounted on the upper end of an upright support 42.

A plurality of internal impellers 44 are mounted in the tube beginning at the inlet end of the tube and terminating at about the mid point of the tube. The impellers are spaced from each other and are located and inclined so that as the container is rotated, the tumbling refuse is urged toward the outlet end of the container. In effect, the impellers form a broken Archimedes screw, which acts as a screw type conveyor at the inlet end of the tube. The space between adjacent impellers prevents the build up of excessive pressures in the tube and avoids undue compaction of the refuse, which would slow aerobic composting.

A plurality of sampling ports 46 are longitudinally spaced along the tube. Each port is closed by a respective cover 48 secured at one edge by hinges 49 to the tube, and held closed at the opposite edge by a pivotable dog 50 mounted on the tube adjacent the opposite edge of the cover. A separate water injection nozzle 52, in the same vertical plane as each sampling port, extends into the container. Each water nozzle is connected through a respective solenoid-operated water valve 54 to a manifold line 56 which in turn is supplied water through a swivel or packing gland 58 mounted on the outlet hopper at the axis of tube rotation, and connected to a water supply 58A through line 59.

An internal longitudinal air duct 62 is mounted on the inside wall of the tube and supplied air from a blower 64 mounted on the outside of the tube. The blower receives electrical power through a lead 66 connected by a brush 68 to a commutator 70 mounted on the outlet hopper. The commutator is supplied electrical power through suitable means (not shown).

Figure 4:
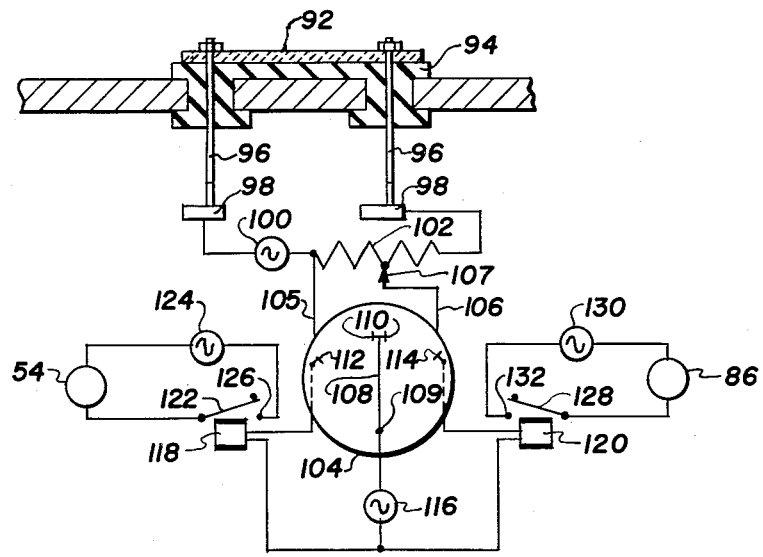
FIG. 4 is a view taken on line 4—4 of FIG. 2 plus a schematic diagram of a circuit for automatically controlling the moisture content of the refuse in the container.
Figure 3:
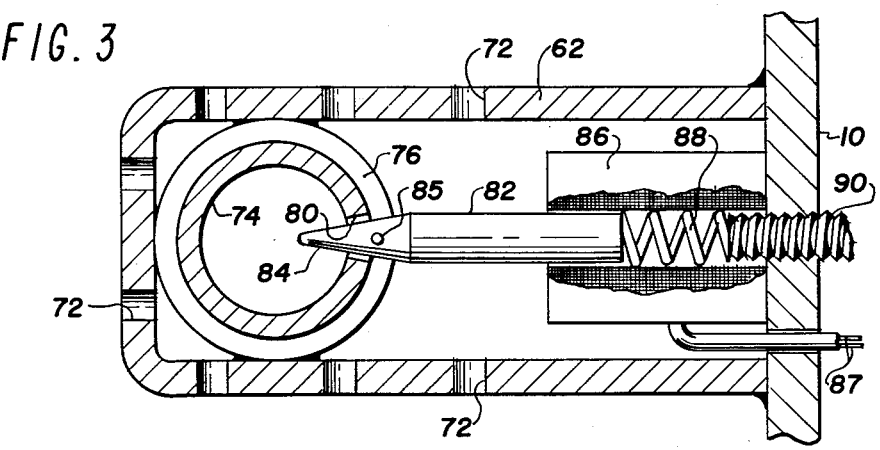
FIG. 3 is an enlarged view taken on line 3—3 of FIG. 1 showing the details of a manifold for admitting air to the refuse in the container.

Referring to FIG. 3, the duct has a plurality of solenoid operated air adding means including perforations 72 provided at longitudinally spaced locations. An elongated and longitudinal distributor pipe 74 has a plurality of longitudinally spaced spacer rings 76 attached to its exterior and welded to the interior of the air supply duct. A plurality of pipe openings 80 are formed in the pipe 74 at longitudinally spaced locations between adjacent water injection nozzles, and a radially extending valve stem 82 with an inner tapered end 84 is disposed so the tapered end of the valve stem fits into the pipe opening 80. A transverse stop pin 85 through the tapered portion of the valve stem limits the inward travel of the valve stem so that the pipe opening 80 is always slightly open. The outer end of the valve stem extends into a solenoid winding 86 mounted on the interior of the tube wall and inside the air duct. The solenoid is furnished power through leads 87 connected to a circuit described in detail with respect to FIG. 4. A compression spring 88 is disposed in the solenoid winding between the outer end of the valve stem and the inner end of a set screw 90 which is threaded through the tube wall. The set screw 90 is used to adjust the compression on spring 88 and thereby control the position of the valve stem in the pipe opening 80 when the solenoid is energized. The stop pin 85 determines the minimum amount of air which flows through the pipe opening 80. When more air is to be supplied through pipe opening 80 than is permitted by the setting of the screw 90, the solenoid is actuated in a manner described below so that the valve stem is pulled into the solenoid, thereby increasing the amount of air which can flow through the pipe opening 80.

A plurality of longitudinally spaced moisture sensing elements 92 (see FIGS. 2 and 4) are mounted on respective insulating bushings 94 which extend through the wall of the container. A separate pair of electrodes 96 are connected at spaced locations to each moisture sensing element and extend through the insulating bushing where each electrode is adapted to make intermittent sliding contact with a respective bus bar 98 disposed under the tube and extending in the direction of rotation of the tube. The moisture sensing elements 92 may be of any suitable material having an electrical resistivity which changes with humidity of the surrounding air. For example, the elements could be of a porous porcelain material which absorbs water in accordance with the relative humidity of the ambient air, and changes resistivity accordingly.

A first source of power 100 is connected in series with a resistor 102, and the bus bars 98. The input of a contact meter 104 is connected through leads 105 and 106 across the resistor 102. The lead 106 has a slidable tap 107 adapted to slide along the resistor and vary the input to the contact meter. The contact meter includes a movable indicator 108 pivoted at one end 109. The free end of the indicator includes a pair of contacts 110 mounted on opposite sides of the indicator and adapted to close against contact 112 when the meter reading falls to a minimum, and close against contact 114 when the meter reading reaches a maximum. A second source of power 116 has one terminal connected to the contact meter indicator. The terminal of the second power source 116 is connected to one end of a first relay winding 118 and to one end of a second relay winding 120. The other end of the first relay winding 118 is connected to the contact 112 of the contact meter, and the other end of the second relay winding is connected to contact 114 of the meter. Relay 118 includes a movable armature 122 which is normally in the position shown in FIG. 4. The armature 122 is connected in series with the solenoid (not shown) of a respective water valve and a third source of power 124. When the relay 118 is energized the armature is moved from the open position against a contact 126 which completes the water valve solenoid circuit to cause the water valve to open and inject water into the tube from the respective nozzle served by that solenoid.

The air valve relay includes a movable armature 128 connected in series with the air valve solenoid 86 and a suitable source of power 130. The armature 128 is normally in the open position shown in FIG. 4. When the relay 120 is energized by high current, indicating high moisture content in the tube, the armature 128 is moved to close the circuit through contact 132, thus energizing the air valve solenoid and causing more air to flow through the respective pipe opening 80 served by that solenoid. Thus, the container is supplied air or water in accordance with the resistivity of the moisture sensing element 92. As shown in FIG. 1, each water valve has its own respective moisture sensing element for detecting and controlling the amount of moisture present in a local zone in the container. There are more air inlet ports than water ports, and a plurality of air valves are controlled by each moisture sensing element.

In the operation of the apparatus, garbage trucks dump mixed refuse directly on to a conveyor system (not shown) ahead of the inlet hopper for the container. Cardboard, bottles, and rags are removed for their salvage value. Large non-compostables, e.g., furniture, tires, water heaters, bed springs, etc., are also removed by hand. Tin cans and other ferrous metals are removed electromagnetically by suitable means (not shown) and sold for copper recovery. The remaining refuse, frequently containing as high as 60% paper, is mechanically conveyed and dropped into the inlet hopper of the container. When necessary, the segregated refuse is comminuted by grinders, shredders, etc., prior to introduction in the tube, thereby insuring increased composting action. As the drum rotates, the refuse is carried upward until it cascades down, being both urged forward and broken up by the internal impellers. This tumbling action thoroughly mixes the refuse, and with the addition of air into the container, aids in keeping the composting action completely aerobic. The moisture content of the refuse in the container is also controlled by the water jets located at intervals along the cylinder. The rocks, glass, and other hard objects in the refuse also aid in grinding and abrading the softer materials. Temperatures up to 140° F. are rapidly reached, and sterilization of all pathogenic organisms occurs within the first 24 hours of operation.

The moisture sensing elements maintain the desired moisture control in the refuse by supplying water or increasing the air supply as needed. For example, if in the beginning of the operation the refuse is relatively dry, say it contains less than 30% moisture by weight, the flow of current through the moisture sensing element is relatively low, and the voltage drop across resistor 102 (referring to FIG. 4) is correspondingly low. This results in a low meter reading, causing the water valve relay 118 to be actuated, thereby opening the water valve as long as the electrodes 96 are in contact with the bus bars 98. Thus, water is intermittently injected and mixed with the refuse until the moisture sensing element achieves a sufficiently low resistance to permit enough current to flow through resistor 102 to cause the meter indicator to assume an intermediate value and break the connection between contacts 110 and 112.

If the refuse should be too moist, the resistance of the moisture sensing element drops accordingly, permitting more current to pass through resistor 102, and causing the meter to read a maximum value and thereby close contacts 110 and 114. The air valve solenoid is energized, thus opening to a maximum the air ports in the region controlled by the moisture sensing device. This condition prevails as long as the electrodes are in contact with the bus bars, and as long as the moisture sensing element has a resistivity which is too low. By adjusting the movable contact 107 of the contact meter along the resistance 102, the moisture content of the refuse in any interval in the container can be controlled within wide limits, thereby insuring flexibility of operation of the apparatus. The ordinary municipal refuse composts at an optimum rate when the moisture content is maintained between about 40% and 65% by weight, and preferably between 50% and 60%. By proper setting of the input to each contact meter, the moisture content of the refuse can be maintained between 50% and 65% at the tube inlet and gradually decreased along the length of the tube so the discharged product has about 30% moisture.

At the outlet end of the container, compost is withdrawn and conveyed to a vibrating screen (not shown) which removes all material which does not pass through ½" openings. The material that does not pass the screen is ground and then reintroduced into the tube. This prevents the accumulation of large solids and re-seeds the refuse with composting organisms.

In an actual installation in which the tube was 76 feet long and 10½ feet in diameter, the tube was rotated at a speed of .8 r.p.m. as refuse was added, and at .2 r.p.m. during the remainder of the time.

Using this apparatus, a dark-colored, non-odorous and easily handled compost was produced from municipal garbage of a typical city in the western United States. A concentration of the major plant nutrients in the compost varied within relatively narrow limits. After a retention time of from 1 to 3 days in the tube, the compost had the following average analysis:

|  | Percent |
|---|---|
| Nitrogen | 1.25 |
| Phosphoric acid | .4 |
| Potash | .3 |

The content of the minor or trace elements, partly organic bound, was high and their presence is of great importance to soil fertility and plant and animal nutrition. Millions of microorganisms that are beneficial to the soil were counted in a single gram of product. These organisms can release inorganic minerals bound in the soil and retain soluble inorganic nutrients which would otherwise be lost by leaching. The compost was capable of holding well over 100% of its own weight in water, and proved to be an excellent soil conditioner, improving soil friability, retaining moisture in the root zone and adding soil warmth, all of which increase the quality and hasten the maturity of crops.

If the compost is retained in the container for 10 to 20 days, a completely stable compost product is produced. However, the economics of the operation show that at the present time, it is preferable to retain the refuse a little over 24 hours in the container, to produce a sterile end product which is "green compost." A profitable use of this product has been to load the material directly into large trailer trucks equipped with manure spreaders, spread it on low quality soil where final stages of decomposition take place with attendant reconditioning of the soil.

We claim:

Apparatus for composting refuse comprising an elongated cylindrical container having its central longitudinal axis extending in a substantially horizontal plane, rotating means operatively connected to said container for rotation thereof about said longitudinal axis, an inlet hopper mounted at one end of said container and an outlet hopper mounted at the other end of said container, an elongated water manifold line mounted longitudinally along a substantial portion of said container for rotation therewith, a plurality of water injection nozzles, a plurality of solenoid operated water injection valves mounted at spaced predetermined locations along said water manifold line and connected to said nozzles, said nozzles being in fluid communication with the inside of said container for injecting water into refuse in the container at a plurality of longitudinally spaced locations as the container is rotated, an elongated air duct mounted longitudinally along a substantial portion of said container for rotation therewith, solenoid operated air adding means mounted at spaced predetermined locations along said air duct in fluid communication with the inside of said container for injecting air into refuse in the container at a plurality of longitudinally spaced locations as the container is rotated, and means operatively connected with said water manifold line and said air duct for controlling the introduction of water and air into the refuse as required to accomplish composting thereof, said means including a plurality of moisture sensing elements mounted on the inside of said container and electrically connected to their respective solenoid operated water injection valves and solenoid operated air adding means, means electrically connected between each sensing means and its respective water injection valve and air adding means responsive to variations in signals from its sensing element to actuate individually and selectively in a predetermined manner its water injection valve and its air adding means to maintain the action of the aerobic bacteria at a maximum level, said container including an internal impeller mounted on the internal walls thereof and defining a screw type conveyor from the inlet hopper for urging the refuse toward the outlet hopper.

References Cited in the file of this patent

UNITED STATES PATENTS

| 1,029,378 | Lawton | June 11, 1912 |
| 1,257,591 | Dungan | Feb. 26, 1918 |
| 1,521,773 | Johnson | Jan. 6, 1925 |
| 2,043,265 | Roeder | June 9, 1936 |
| 2,178,818 | Earp-Thomas | Nov. 7, 1939 |
| 2,241,734 | Peterson | May 13, 1941 |
| 2,285,834 | Proctor | June 9, 1942 |
| 2,474,833 | Eweson | July 5, 1949 |
| 2,543,776 | Greisen | Mar. 6, 1951 |
| 2,798,800 | Geraghty et al. | July 9, 1957 |
| 2,823,106 | Pierson | Feb. 11, 1958 |